United States Patent [19]

Molnar

[11] Patent Number: 5,464,455
[45] Date of Patent: Nov. 7, 1995

[54] SPECIALTY SOD MATS CONSTRUCTED OF NONWOVEN FABRIC WITH APERTURES

[75] Inventor: Charles J. Molnar, 12 Malvern Ct., Devon, Wilmington, Del. 19810

[73] Assignees: Charles J. Molnar; Judith R. Molnar, both of Wilmington, Del.

[21] Appl. No.: 95,684

[22] Filed: Jul. 21, 1993

[51] Int. Cl.⁶ .............................. A01C 1/04; A01C 1/00; A01B 79/00
[52] U.S. Cl. .................... 47/1.01; 47/9; 47/56; 47/58; 156/61
[58] Field of Search ................... 47/9, 9 C, 9 M, 47/9 P, 9 R, 9 S, 9 SC, 56, 58.25, 58; 156/60, 61

[56] References Cited

U.S. PATENT DOCUMENTS

| | | | |
|---|---|---|---|
| 3,516,196 | 6/1970 | Lippoldt | 47/56 |
| 3,557,491 | 1/1971 | Franklin et al. | 47/56 |
| 3,863,388 | 2/1975 | Loads | 47/56 |
| 3,890,739 | 6/1975 | Blackburn | 47/56 |
| 3,914,901 | 8/1975 | Muldner | 47/56 |
| 4,023,506 | 5/1977 | Robey | 111/1 |
| 4,336,668 | 6/1982 | Decker | 47/58 |
| 4,342,807 | 8/1982 | Rasen et al. | 428/180 |
| 4,539,038 | 9/1985 | Gambert | 71/64.11 |
| 4,584,790 | 4/1986 | Gaugher | 47/56 |
| 4,786,550 | 11/1988 | McFarland et al. | 428/203 |
| 4,934,094 | 6/1990 | Walton | 47/56 |
| 4,941,282 | 7/1990 | Milstein | 47/58 |
| 4,986,026 | 1/1991 | Decker | 47/56 |
| 5,189,833 | 3/1993 | Clark | 47/56 |
| 5,224,290 | 7/1993 | Molnar et al. | 47/56 |
| 5,224,292 | 7/1993 | Anton | 47/56 |

OTHER PUBLICATIONS

Organic Gardening, Sep.–Oct. 1990, pp. 47–49 "Something Wild" by Jeff Cox.
Hort Science, 8(1), pp. 89–91, 1983 "Developing Wild Flower Sods" by Airhart et al.
Hort Science, 12(5), pp. 492–494 (1977) "The Production of Ground Covers in a Sod–Like Manner" by Sterrett et al.
Proceedings of the International Plant Propagators Society, vol. 25, 1975, pp. 408–412 "Ground Cover Sods . . . " by Sterrett et al.
Cooperative Extension Service, Univeristy of Delaware, 1974 "Sod Production with Plastic Netting" by Mitchell et al.

*Primary Examiner*—David T. Fox
*Assistant Examiner*—Erich E. Veitenheimer

[57] ABSTRACT

New and improved sod mats of grasses, nutritional plants and ornamental plants have been developed for many garden and landscape applications. The improvement comprises growing plants whose roots penetrate and entangle with an improved nonwoven sod reinforcement to form versatile sod mats. Nonwoven sod reinforcements contain apertures to facilitate uniform water infiltration and root wetting. The sod mats can be produced with many diverse planting mediums and in both large and small sizes. Sod mats may be sod in rolls or in rectangular mats.

27 Claims, 8 Drawing Sheets

SPECIALTY SOD MATS CONSTRUCTED OF NONWOVEN FABRIC WITH APERTURES

This invention relates to modified sod mats reinforced with nonwoven sod reinforcements which facilitate early harvest, ease of handling, have excellent long term water infiltration and root wetting characteristics and are very versatile.

BACKGROUND OF THE INVENTION

Reinforced sods have long been known in the art. Sod mats of groundcovers, flowers, and playing field grasses are among the examples.

Molnar (U.S. Pat. No. 5,224,290) discloses flower and groundcover sod mats reinforced with nylon sod reinforcements. Decker (U.S. Pat. No. 4,986,026) discloses tall fescue sod mats which are very large and employ planting mediums containing straw and sewage sludge. Molnar (application Ser. No. #07/745224) discloses flower and groundcover sod mats reinforced with polypropylene sod reinforcements. Milstein (U.S. Pat. No. 4,941,282) discloses wildflower sod mats reinforced with polyester fabrics. McFarland (U.S. Pat. No. 4,786,550) discloses a lightweight seed mat formed with melt blown nonwovens. Walton (U.S. Pat. No. 4,934,094) discloses a grass sod reinforced with netting. Decker (U.S. Pat. No. 4,336,668) discloses a novel method of growing groundcover sods reinforced with synthetic netting. Muldner (U.S. Pat. No. 4,190,981) discloses a complex lightweight seed mat using complex expensive equipment. Airhart in HortScience 18(1), 89–91, 1983 discloses groundcover and flower sods reinforced with synthetic netting.

In general, sod mats reinforced with synthetic spunbond nonwoven fabrics are excellent all purpose sod mats. They have very good sod mat production characteristics, good strength and are easy to handle. They may, however, have special hydrophilic treatments or particular chemistries to promote good water infiltration and root wetting. The particular hydrophilic treatments add complexity and cost to manufacture. In addition, in some cases the hydrophilic treatment does not last as long as desired. Furthermore, one must be sure any hydrophilic treatments which leach out do not have an adverse impact on the environment. Often, nonwoven chemistries which are naturally hydrophilic are also generally more expensive and thus also increase cost.

Sod mats employing natural reinforcements such as straw, bark, or water sensitive glues can decompose prematurely if harvest time is delayed or if the planting medium is particularly biologically active.

Sod mats reinforced with synthetic netting have excellent water infiltration characteristics but have certain limitations. If the netting openings are large, harvest is usually delayed, while if the netting openings are small, the roots of the specialty plants can be girdled. Neither leads to sod mats with both optimum sod mat production and growing characteristics. If the netting openings are large, the netting can also be troublesome to completely cover with planting medium.

In view of the above background art, there still exists a need for modified sod mats which combine the advantages of early harvest time, good "shelf life" stability, versatility, good long term water infiltration characteristics and which promote root wetting, are easy to handle and propagate, and are easy and inexpensive to manufacture. Reduced water runoff combined with improved water infiltration and root wetting have particularly high utility on highly sloped landscape applications. Objects of the current invention are then to develop a select group of preferred modified sod mats along with their method of manufacture which combine the advantages of early harvest time, good "shelf life" stability, versatility, and have good long term water infiltration characteristics, promote good root wetting, are easy to handle and propagate, and are also economical to propagate. It is a further object of the invention to minimize or eliminate the need for relatively expensive and complex hydrophilic treatments for low cost nonwoven sod reinforcements. Another object of the current invention is to minimize or eliminate any environmental contamination possibilities from hydrophilic treatments. Another object of the present invention is develop modified sod mats based on nonwoven sod reinforcements which are easy to recognize as having good water infiltration and root wetting without having to resort to time consuming or expensive chemical testing for hydrophilic treatments or chemical testing of the nonwoven fabric. In addition, another object of this invention is to develop a manufacturing process for these modified sod mats with good sod mat production characteristics.

Other objects and advantages of the current invention will become more apparent to those skilled in the art in view of the following description and examples.

BRIEF DESCRIPTION OF DRAWING FIGURES

A brief description of the figures and reference numerals follows.

Reference Numerals in Drawings

Figure 1:
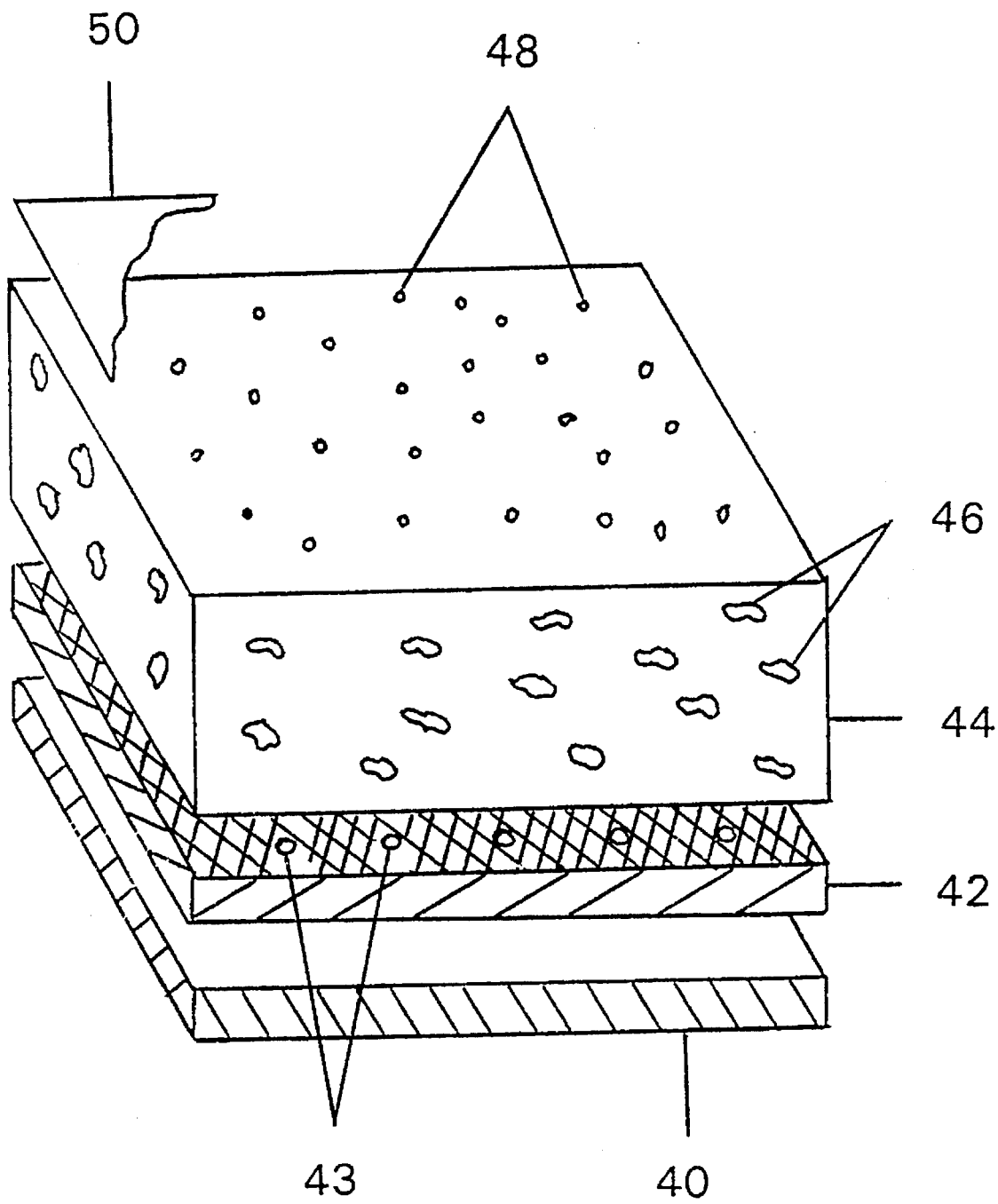
FIG. 1 is a simplified perspective view of a newly planted modified sod mat.

40 Surface sod mat is growing on.
42 Nonwoven sod reinforcement
43 Apertures in the nonwoven sod reinforcement
44 Planting medium
46 Planting medium amendments such as wood chips, hay, straw, and the like
48 Plant starting material
50 Crop cover
52 Mature plants ready for harvest
54 Mature plant roots
56 Mature plant roots penetrating the nonwoven sod reinforcement
58 Nonwoven sod reinforcement fibers
60 Bonded fibers in the bonded region of pattern bonded nonwoven fabric 62 Nonbonded fibers in the nonbonded region of pattern bonded nonwoven fabric
64 Fibers in the high entanglement region of pattern entangled nonwoven fabric
66 Fibers in the low entanglement region of pattern entangled nonwoven fabric
70 Prepare flat for planting.
72 Install nonwoven sod reinforcement.
74 Install planting medium. Add planting medium amendments as desired.
76 Add plant starting material.
78 Keep moist and add appropriate planting amendments. Allow to mature into a sod in 1–18 months.
80 Harvest.
82 Prepare field for weed guard and lay down plastic film.
84 Install bed edging.

SUMMARY OF THE INVENTION

The invention is a new, modified plant sod mat comprising a nonwoven sod reinforcement wherein the nonwoven sod reinforcement is a nonwoven fabric with apertures and a layer of planting medium on said nonwoven sod reinforcement and containing viable plants growing in said planting medium and whose roots penetrate and entangle with said nonwoven fabric and thus form a sod mat. Apertures preferably cover less than 40% of the surface area of said nonwoven sod reinforcement, and more preferably less than about 25% of the surface area of said nonwoven sod reinforcement and even more preferably less than about 15% of the surface area of said nonwoven sod reinforcement. Apertures are preferably from about 0.4 to 0.015 cm in diameter and more preferably from about 0.4 to 0.02 cm in diameter and most preferably from about 0.25 to 0.03 cm in diameter.

Based on the instant invention, I have by figures, explanation, and example shown how to effectively grow these modified sod mats to meet customer needs.

Description of Preferred Embodiments—FIGS. 1–6

Sod mats of this invention are often referred to as modified sod mats in this specification. FIG. 1 is a fragmentary cross section of a typical modified sod mat according to this invention. A modified sod mat is a sod mat that is reinforced with a nonwoven sod reinforcement wherein the nonwoven sod reinforcement is a nonwoven fabric containing apertures. Reference Numeral 40 is a suitable surface on which to grow sod mats such as a heavy (e.g. 6 mil) black polyethylene film. Other surfaces such as plywood, heavy perforated plastic film, rubber sheeting, or concrete may also be used. In a field grown application, the sod growing surface prevents weeds from growing into and through the sod mat from below and also encourages the plant roots to grow laterally and entangle with the nonwoven sod reinforcement and thus, form a sod mat. In a flat grown application, the bottom of the flat normally serves as the sod mat growing surface. Good drainage in the flat is important. Reference Numeral 42 is the nonwoven sod reinforcement. The nonwoven sod reinforcement comprises a nonwoven fabric with apertures. Reference Numeral 43 are the apertures which facilitate good water infiltration. Reference 44 is the planting medium. The planting medium is adjusted to the optimum depth for the particular plant species. For modified sod mats of this invention, planting mediums are employed such as REDI-EARTH® manufactured by W. R. Grace or FAIRGROW® manufactured by Delaware Solid Waste Authority of Wilmington, Del. Composted waste products are particularly useful because of their general low cost and light weight. Further examples of suitable planting mediums are disclosed in U.S. Pat. Nos. 4,720,935 by Rogers et. al., 4,934,094 by Walton, 4,941,282 by Milstein, and 4,986,026 by Decker and are included by reference. Soil can also be used effectively. Light weight planting mediums are preferable and have a dry volume density below 700 grams per liter dry weight and more preferably below 500 grams per liter dry weight. Preferable planting mediums have a dry volume density of greater than about 150 grams per liter dry weight. Examples of planting medium amendments are represented by Reference Numeral 46 and include fertilizers, lime, hydrogels, PERLITE®, wood chips, hay, straw, and the like and are well known in the art. Reference Numeral 48 represents the plant starting materials. Representative plant starting materials include seeds, seedlings, plant plugs, rooted cuttings, root divisions, cuttings, and viable plant materials derived from plant tissue cultures and the like. Seedlings, rooted cuttings and the like are spaced according to the particular plant species but normally are spaced on a 5 to 20 cm grid pattern. Reference Numeral 50 represents common crop covers which offer some protection from marauding birds or some over winter protection.

Figure 2:
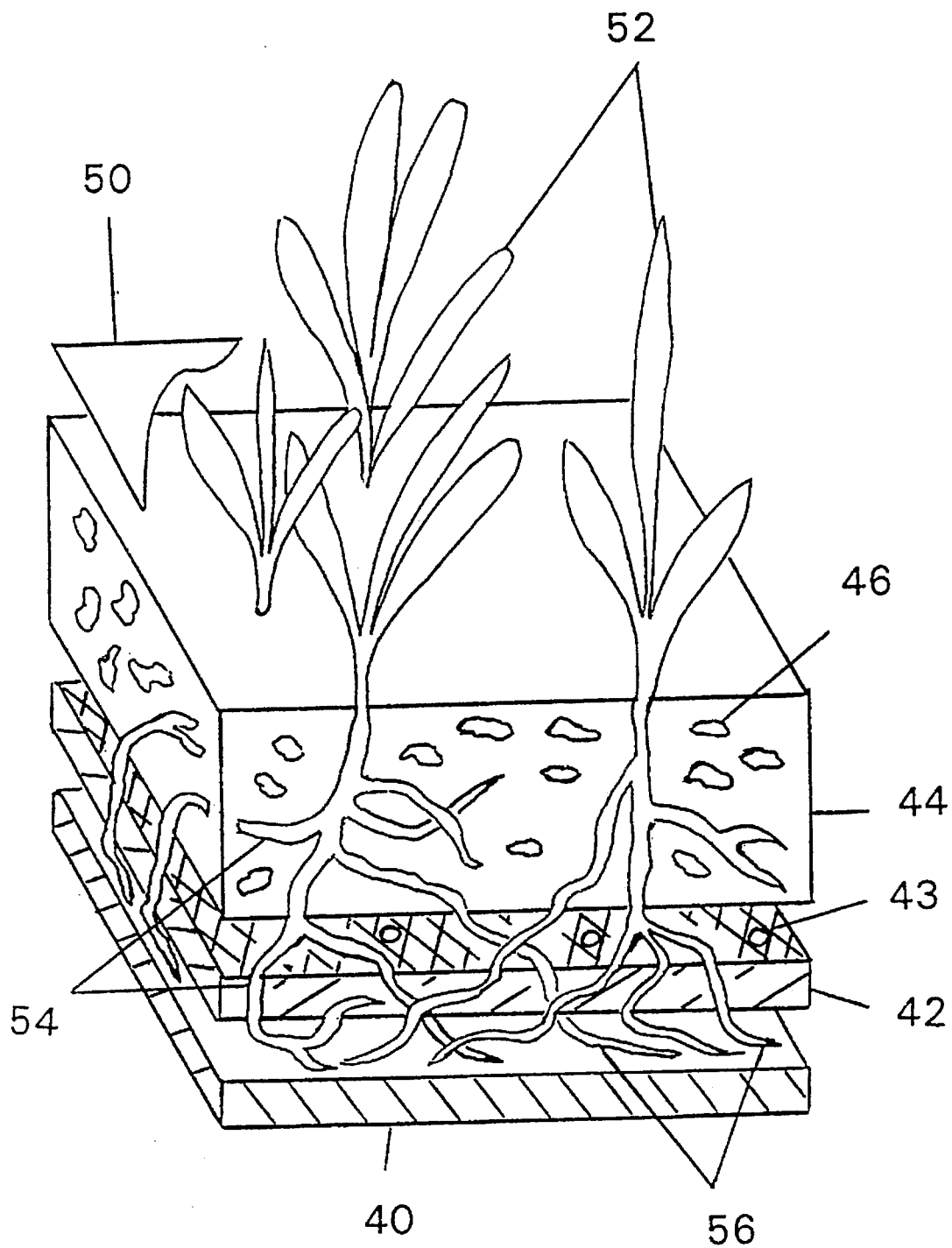
FIG. 2 is a simplified perspective view of a modified sod mat ready for harvest.

FIG. 2 is a fragmentary cross section of a mature modified sod mat according to this invention. Reference Numeral 40 is a suitable surface on which to grow sod mats. Reference Numeral 42 is a nonwoven sod reinforcement. Reference Numeral 43 represents the apertures in the nonwoven fabric. Reference Numeral 44 is the planting medium. Reference Numeral 50 represents common crop covers such as hay or nonwoven fabrics which may be used to help reduce frost or wind damage and in general aid over wintering. Reference Numeral 52 depicts the mature plants ready for harvest. A preferred class of plants is nutritional plants which is comprised of herbs and vegetables. Representative examples of nutritional sod mats include sods of thyme and cherry tomatoes. Another preferred class of plants is ornamental plants which is comprised of flowers and groundcovers. Representative ornamental plant examples include ivy, cosmos, bedding plants, and special hostas. A particularly preferred class of plants is garden plants which is comprised of both nutritional and ornamental plants. Another preferred class of plants is grasses. Specialty grasses is a preferred class of grasses which is comprised of both bunch grasses and shade grasses. Representative examples of bunch grasses are perennial rye grass and tall fescue grass. Reference Numeral 54 depicts the roots of the mature plants ready for harvest penetrating and entangled with each other and to the nonwoven sod reinforcement. Reference Numeral 56 represents the plant roots which penetrate the nonwoven sod reinforcement.

Figure 3:
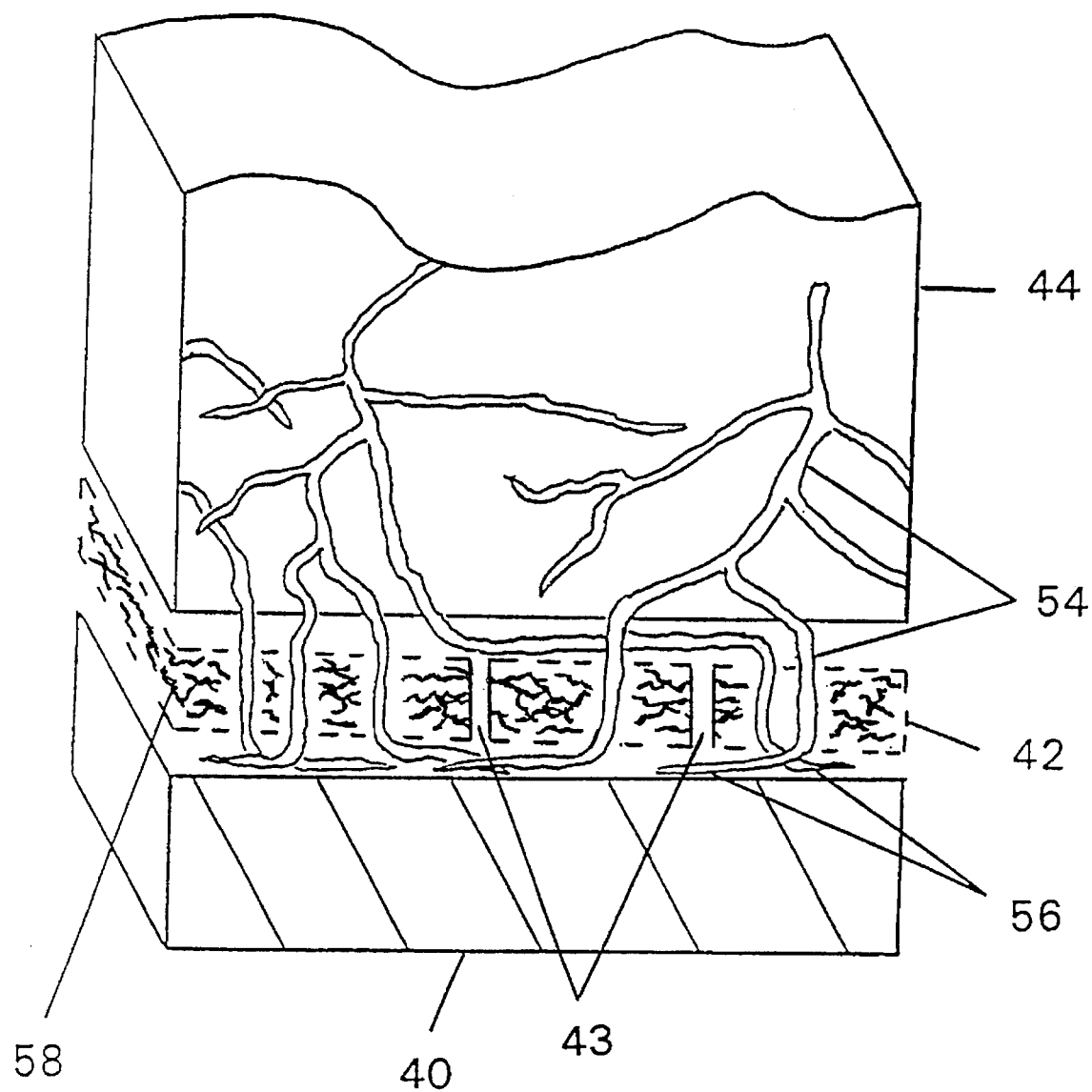
FIG. 3 is an artist's conception of the important root penetration in a modified sod mat.

FIG. 3 is an artist's expanded view of a mature modified sod mat according to this invention to better show some of the key characteristics. Reference Numeral 40 represents the surface on which to grow the sod. Reference Numeral 44 represents the planting medium. Reference Numeral 54 represents the plant roots of the sod mat ready for harvest which bind the planting medium to the nonwoven sod reinforcement. Reference Numeral 42 is the nonwoven sod reinforcement. Reference Numeral 43 represents the apertures in the nonwoven fabric. Reference Numeral 56 represents the plant roots which penetrate the nonwoven sod reinforcement. Reference Numeral 58 are the fibers of the nonwoven sod reinforcement.

Figure 4:
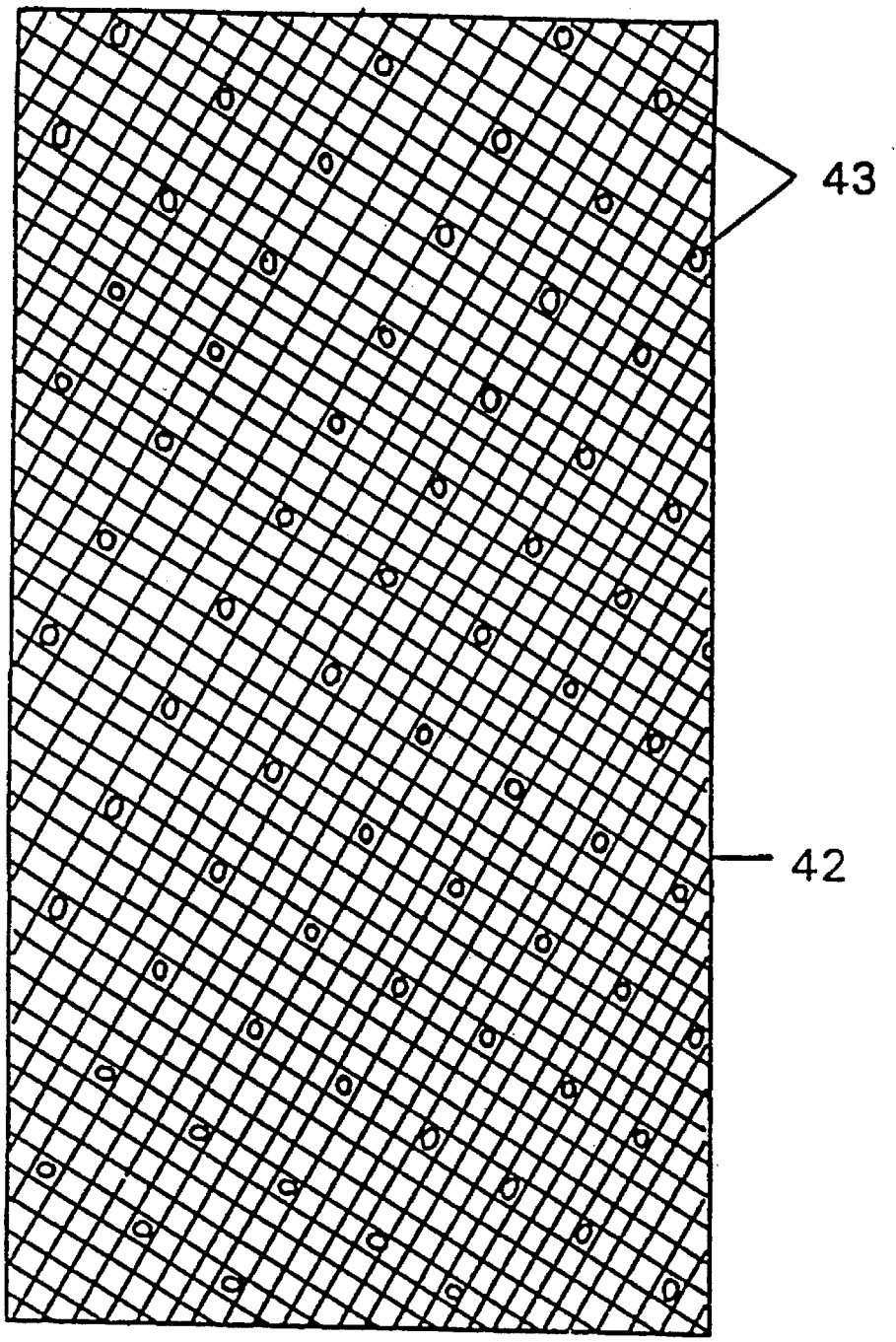
FIG. 4 is a simplified view of a nonwoven sod reinforcement of this invention illustrating the apertures.

FIG. 4 is a simplified view of a nonwoven sod reinforcement of this invention. It more clearly displays the apertures (Reference Numeral 43) in the nonwoven sod reinforcement (Reference Numeral 42). The apertures are preferably arranged in a repeating pattern as shown in this FIG. 4. Examples of preferable repeating patterns are rectangular, circular and triangular. Combinations of these preferable patterns are also very useful.

Sod mats are often utilized on highly sloped areas. Lowering water runoff and increasing water infiltration reduces erosion and improves root wetting and plant health in general. Very large grass sod mats can be installed to reduce the labor during installation. Very large sod mats normally require very good sod integrity. Decker (U.S. Pat. No. 4,986,026) accomplishes this objective by using particular species of grasses and planting mediums. By using heavy or strong sod mat reinforcements, many different grass sods along with other plant types can be grown in large sod mats. Low cost, strong nonwoven sod reinforcements are known in the art (for instance see U.S. patent application Ser. No. 07/745224 filed by Molnar et al) but many suffer from low water infiltration rates or high water runoff on slopes because of the high nonwoven fabric basis weights used in conjunction with the hydrophobic nature of the chemistry of the low cost nonwoven fabrics. There are also low strength, nonwoven reinforced sod mats which have lower than desired water infiltration rates or higher than desired water runoff when used in sloped applications. Lower strength sod mats are often used for nutritional plants so particular care is exercised to assure any hydrophilic treatments applied to the nonwoven fabric are not leached out and absorbed by the edible plants.

We have found that sod mats produced with nonwoven sod reinforcements wherein the nonwoven sod reinforcements is a nonwoven fabric with apertures are surprisingly versatile and meet many unmet needs for sod mats in gardening, landscaping and horticulture. Large grass sod mats, from about 5 to 50 square yards, are effectively grown with nonwoven sod reinforcements and reduce the landscaping labor during installation. Sod mats using a nonwoven sod reinforcement wherein the nonwoven sod reinforcement is a nonwoven fabric with apertures of the current invention are easily recognized as having good water infiltration and root wetting properties without the need to resort to chemical testing. This is valuable to the sod industry since most sod growers lack the facilities and/or expertise to make these chemical analyses. An additional important benefit of the nonwoven sod reinforcements of this invention is that the apertures form pathways to facilitate excellent root penetration while at the same time the multiple fibers of the nonwoven fabric facilitates excellent root entanglement with the nonwoven fabric and good handling characteristics of sod mats of this invention. Thus nonwoven sod reinforcements containing apertures of this invention are the first sod reinforcements to combine the benefits of excellent water infiltration and ease of root penetration of prior art netting reinforcements with the good root entanglement and sod mat handling characteristics of prior art nonwoven sod reinforcements. Sod reinforcements of this invention are also easy to cover with planting medium. Sod mats using the nonwoven fabric with apertures of this invention are readily manufactured. The manufacture of the nonwoven fabrics is simplified with many low cost nonwoven fabrics because the need for hydrophilic treatment is eliminated. As apertures cover a higher percentage of the surface area, they can reduce the strength of the nonwoven sod reinforcement, but of course, ease of water infiltration is increased. At lower percentages of aperture coverage, root entanglement with the nonwoven fabric is enhanced and the ease of water infiltration and root wetting are surprisingly good. Good modified sod mats can be made with either high or low percentage coverage ranges, especially in the following preferred ranges. I have found by careful experimentation that nonwoven fabrics wherein the apertures cover less than or equal to about 40% of the surface area of the nonwoven fabric are preferable and nonwoven fabrics wherein apertures cover less than or equal to about 25% of the surface area of the nonwoven fabric are more preferable and nonwoven fabrics wherein apertures cover less than or equal to about 15% of the surface area of the nonwoven fabric are even more preferable and nonwoven fabrics wherein apertures cover less than about 10% of the surface area of said nonwoven sod reinforcement are most preferred. Preferable nonwoven fabrics have greater than or equal to about 0.1% of the surface area covered by apertures and more preferably greater than or equal to about 0.3% of the surface area covered by apertures and even more preferably greater than or equal to about 1% of the surface area covered by apertures. The percentage of the surface area covered by the apertures may be calculated by well known equations. For example, the percentage of the surface area covered by round apertures is calculated as follows:

Number of apertures in a 10 cm by 10 cm area of nonwoven fabric: 100

Aperture Diameter: 0.2 cm $$\text{\% Surface area covered by aperatures} = \frac{(100 \text{ aperatures}) \times ((0.1 \text{ cm})^2 \times (314))}{(10 \text{ cm})^2}$$

$$\text{\% Surface area covered by aperatures} = 3.1\%$$

Preferred apertures are round, oblong, diamond, or rectangular in shape. These are efficient and economical to produce with good quality control. Other shapes of apertures can also be effectively used. Applicant currently prefers round, rectangular and oblong shapes which currently are efficient to manufacture. By careful experimentation and analysis, I have determined that apertures are preferably greater than or equal to about 0.015 cm in diameter and more preferably greater than or equal to about 0.02 cm in diameter and even more preferably greater than or equal to about 0.03 cm in diameter. The preferred apertures are normally less than or equal to about 0.4 cm in diameter and more preferably less than or equal to about 0.25 cm in diameter and even more preferably less than or equal to about 0.15 cm in diameter. Where apertures are not round, the referenced diameter is the maximum distance from one side to the other side of the aperture. Apertures are preferably spaced within a distance of less than about 2 cm from each other and more preferably less than about 1 cm from each other and even more preferably less than 0.5 cm from each other. Apertures are preferably spaced greater than a distance of about 0.01 cm from each other and more preferably greater than about 0.015 cm from each other and even more preferably greater than 0.02 cm from each other. Control of size and spacing of the apertures to the preferred ranges aids in promoting uniform wetting of the plant roots during propagation and subsequent transplanting.

Effective nonwoven sod reinforcements are made with many types of nonwoven fabrics. Nonwoven fabrics are broadly defined as web structures made by mechanically, thermally or chemically bonding or entangling thermoplastic fibers. The fibers can be continuous or discrete lengths or mixtures thereof. When practiced according to the guidance of this instant invention by those of ordinary skill in the art, all common types of nonwoven fabric can be utilized effectively. Preferred nonwoven fabrics comprise melt blown nonwoven fabrics, spunbond nonwovens, hydroentangled nonwovens, and carded nonwovens. The dry carded process generally uses cut staple fiber bonded together using usual art-known bonding techniques such as adhesive binders, heated calendar rolls, hot air, sonic, laser, pressure bonding needle punch and the like. Chemically bonded nonwoven fabrics generally use latex binders. Hydroentangled, melt blown, and spunbonded nonwovens are especially preferred types of nonwoven sod reinforcements because they are easily produced, highly versatile, have minimum chemical additives (for example, binders), and have good sod mat reinforcement characteristics. Nonwoven fabrics may comprise a number of different chemistries such as polyesters, polyolefins, acrylics, and nylon. Particularly preferred chemistries are polyesters and polyolefins. Preferred polyolefins include polypropylene and polyethylene. An example of a preferred polyethylene copolymer is linear low density polyethylene. Other preferred polyethylenes are copolymers of polyethylene with higher alpha-olefins having 4 to 18 carbon atoms.

The technology to produce these nonwoven fabrics is well known and well documented in the open art. A particularly well known reference is the Kirk-Othmer Encyclopedia of Chemical Technology published by John Wiley and Sons, London/New York, Vol. 16, 3rd Edition, 1978, pages 72–124. Some illustrative examples of nonwoven fabric processes well known in the art include U.S. Pat. Nos. 5,151,320 to Homonoff, 5,108,820 to Kaneko, 5,098,764 to Drelich et. al., 5,068,141 to Kubo, 4,997,611 to Hartman, 4,970,104 to Radwanski, 4,857,065 to Seal, 4,755,178 to Insley, 4,753,834 to Braun, 4,469,734 to Minto et al, 4,451,315 to Miyazaki, 3,978,185 to Buntin et al, 3,795,571 to Prentice, and 3,454,519 to Hulse and are included herein by reference. These references are not meant to limit nonwoven fabrics or technologies useful in this invention, but only to serve as helpful guidance to those skilled in the art. Products of these general description are available commercially from companies such as Ergon in Jackson, Miss., Kimberly-Clark in Neenah, Wis., Johnson & Johnson Advanced Materials Co. in New Brunswick, N.J., and Poly-bond Incorporated in Charlotte N.C. Table 1 below shows some nominal physical properties of candidate nonwoven sod reinforcements before apertures are added.

TABLE 1

Some Nonwoven sod reinforcement Candidates and nominal Physical Properties (before apertures are created).

| Product | Grab Tensile Strength | | Fiber | Air Permeability |
|---|---|---|---|---|
| | MD (lbs/in) | TD (lbs/in) | Denier (dtex) | (cfm/sq ft.) |
| ENPP 0177 | 1.5 | 1.8 | 0.3 | 370 |
| ENPP 0108 | 5.2 | 4.6 | 0.3 | 106 |
| ENPY 0024 | 1.7 | 2 | 0.3 | 258 |
| POLYBOND ® 1.0 opsy | 23 | 17 | 3.5 | 550 |
| ACCORD ® 108 0.8 opsy | 10 | 13 | 3.5 | 453 |

Grab tensile strength: Test Method ASTM D-1682-64
Air permeability: Test Method ASTM D-737-75 at 0.5 inch of water.
ENPP and ENPY are melt blown nonwoven fabrics manufactured by Ergon.

POLYBOND ® is spunbond nonwoven fabric manufactured by Poly-bond Incorporated.

TABLE 1-continued

Some Nonwoven sod reinforcement Candidates and nominal Physical Properties (before apertures are created).

| Product | Grab Tensile Strength | | Fiber | Air Permeability |
|---|---|---|---|---|
| | MD (lbs/in) | TD (lbs/in) | Denier (dtex) | (cfm/sq ft.) |

ACCORD ® is spunbond nonwoven fabric manufactured by Kimberly-Clark.

Apertures may be created in the nonwoven sod reinforcement as it is manufactured into a nonwoven fabric. Alternately, the apertures may be easily added by post modification of nonwoven fabric. Apertures are usually formed thermally and/or mechanically by methods which are well known to those skilled in the art. Apertures can completely penetrate the nonwoven fabric or partially penetrate the nonwoven to form preferred channels for water infiltration. A method of manufacturing the apertures is to use hot needling where the nonwoven fabric is passed under reciprocating needles or needles on rotating rollers, the needles being heated to about the melting temperature of the nonwoven fabric. Another technique is by heat embossing a nonwoven fabric at a temperature above the softening point of the fibers whereby the regions of the nonwoven fabric compressed by the projections of the embossing means become fused and immediately thereafter drafting the embossed nonwoven fabric so that apertures are formed in the fused patterned regions. A third method of perforating a nonwoven fabric is by directing the nonwoven fabric through a nip defined by first roll and second roll. As the nonwoven fabric moves through the nip it is penetrated by a plurality of heated pins projecting from the first roll which enter heated apertures formed in the second roll. The penetration of the hot pins causes the fibers of the nonwoven fabric to separate and enter into the apertures and form openings through the web. These and other technologies to produce apertures are well known to those of ordinary skill in the art. Some illustrative reference examples are U.S. Pat. Nos. 5,098,764 to Drelich et. al., 4,886,632 to Van Iten et al., 4,780,352 by Palumbo, 4,588,630 by Shimalla, and 4,469,734 by Minto, and are included herein by reference. Any of the above described methods and means of manufacturing nonwoven fabrics with apertures may be employed as well as others which will suggest themselves to those skilled in the art.

Figure 5:
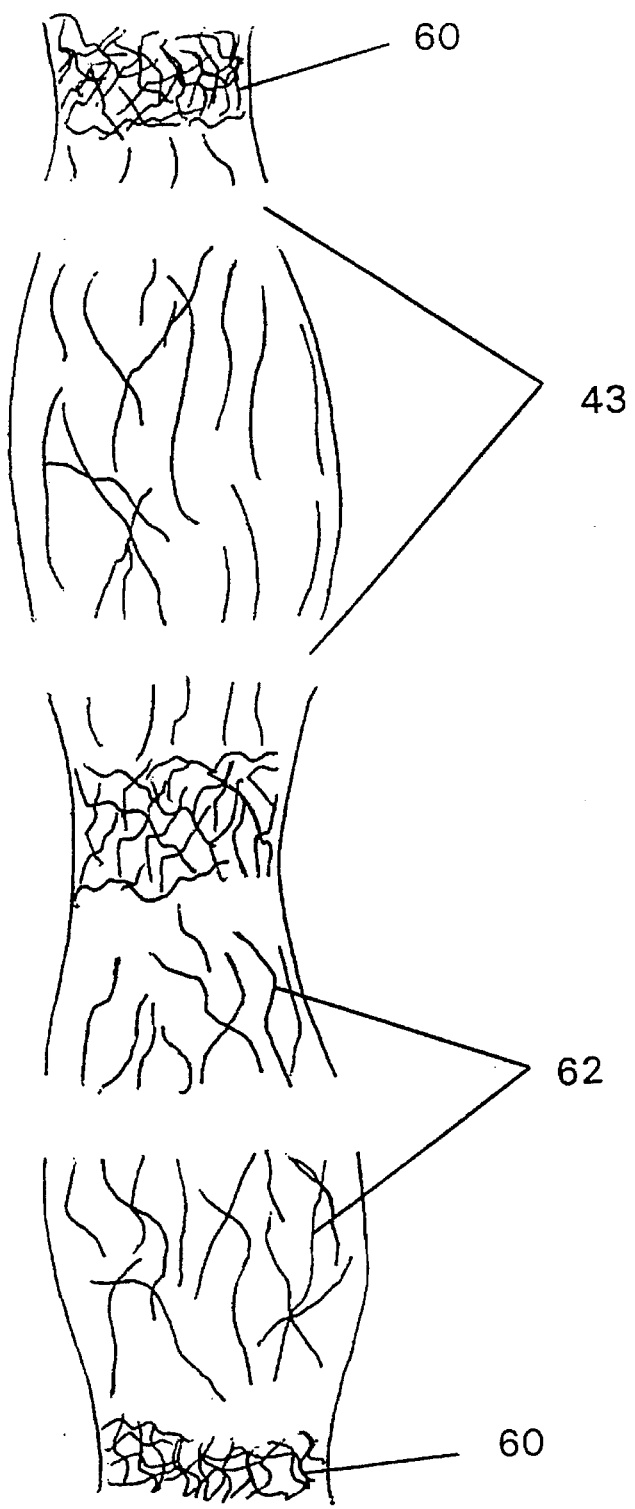
FIG. 5 is a simplified artist's cross-sectional view of a nonwoven sod reinforcement made with a pattern bonded nonwoven fabric.

Pattern bonded and pattern entangled nonwoven fabrics are particularly preferred for nonwoven fabrics with apertures. Pattern bonding means that only localized areas of the nonwoven fabric are bonded and the remaining nonbonded fiber regions contain synthetic fibers which can easily move about in localized regions. These localized nonbonded fiber regions contain synthetic fibers which move, entangle and otherwise promote good root penetration and entanglement. FIG. 5 is a simplified artist's cross-sectional view of a nonwoven sod reinforcement made with a pattern bonded nonwoven fabric wherein Reference Numeral 60 represents the bonded fibers in the bonded region and Reference Numeral 62 represents the nonbonded fibers in the nonbonded fiber region. Reference Numeral 43 represents the apertures. The area ratio of the nonbonded fiber region (Reference Numeral 62) to the bonded fiber region (Reference Numeral 60) in FIG. 5 is the nonbonded fiber region's surface area in square centimeters divided by the bonded fiber region's surface area in square centimeters. For example if a particular pattern bonded, nonwoven fabric has a total surface area of 50 square centimeters of which the surface area of the nonbonded fiber region is 40 square centimeters and the bonded regions surface area is 10 square centimeters then the area ratio of the nonbonded fiber region to the bonded fiber region is 4/1.

Figure 6:
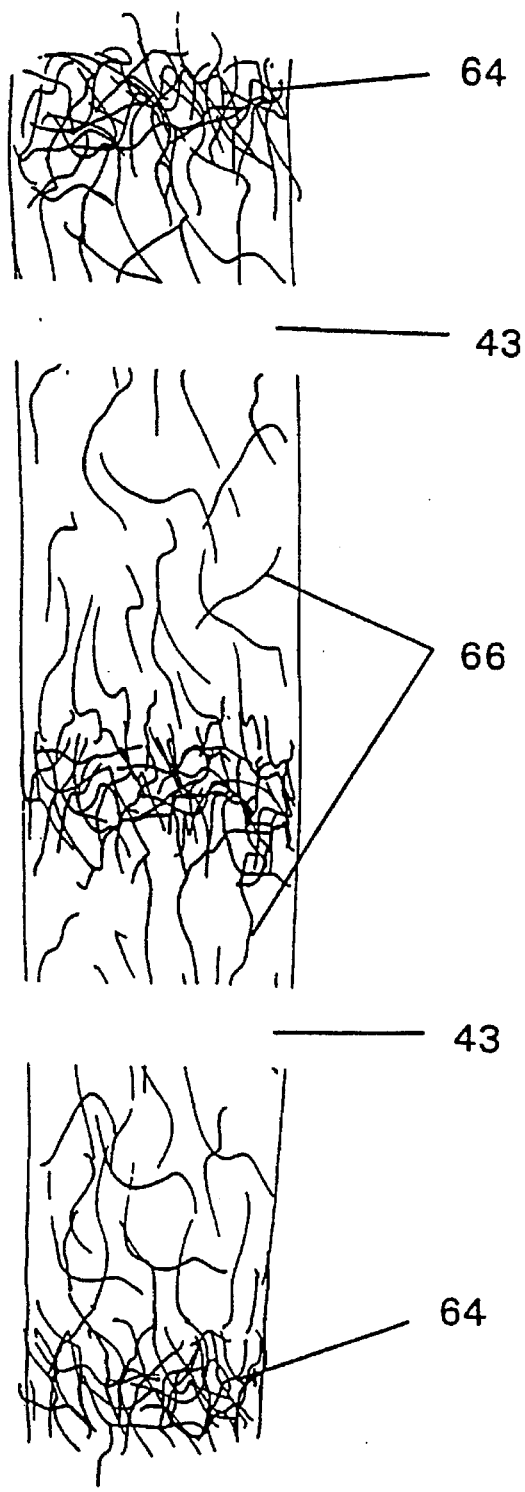
FIG. 6 is a simplified artist's cross-sectional view of a nonwoven sod reinforcement made with a pattern entangled nonwoven fabric.

In a similar fashion, entangled nonwovens can have relatively uniform entanglement across the nonwoven fabric which will be termed area entangled nonwoven fabrics in this specification. There are also nonwoven fabrics which contain localized regions of highly entangled fibers and also localized regions of low entanglement which will be termed pattern entangled nonwoven fabrics in this specification. Similar to pattern bonded nonwoven fabrics, pattern entangled nonwoven fabrics are especially preferred because the regions of low entanglement promote good root penetration and entanglement. FIG. 6 is a simplified artist's cross-sectional view of a nonwoven sod reinforcement made with a pattern entangled nonwoven fabric wherein Reference Numeral 64 represents the fibers in the high entanglement region and Reference Numeral 66 represents the fibers in the low entanglement fiber region. Reference Numeral 43 represents the apertures. The area ratio of the low entanglement fiber region (Reference Numeral 66) to the high entanglement fiber region (Reference Numeral 64) in FIG. 6 is the low entanglement fiber region's surface area in square centimeters divided by the high entanglement fiber region's surface area in square centimeters. The hydroentangling process can also be used to make apertures by those skilled in the art. Pattern bonded nonwoven fabrics and pattern entangled nonwoven fabrics are especially useful for large sod mats requiring higher strength nonwovens such as grass sods greater than 5 square meters in size because plant root penetration and entanglement is facilitated with these nonwoven fabrics. Examples of preferred pattern bonded nonwoven fabrics are spunbonded and dry bonded nonwoven fabrics. An example of a preferred pattern entangled nonwoven fabric is a hydroentangled nonwoven fabric. The preferred area ratio of the nonbonded fiber region to the bonded fiber region for pattern bonded, nonwoven fabrics is greater than 2/1 and more preferably greater than 4/1 and even more preferably greater than 10/1. The preferred area ratio of the nonbonded fiber region to the bonded fiber region for pattern bonded, nonwoven fabrics is preferably less than about 1000/1 and more preferably less than 100/1 and even more preferably less than 30/1. The preferred area ratio of the low entanglement fiber region to the high entanglement fiber region for pattern entangled, nonwoven fabrics is preferably greater than 3/1 and more preferably greater than 4/1 and even more preferably greater than 10/1. The preferred area ratio of the low entanglement fiber region to the high entanglement fiber region for pattern entangled nonwoven fabrics is less than 1000/1 and more preferably less than 100/1 and even more preferably less than 30/1. These high area ratios of fibers which facilitate good root penetration and entanglement with the pattern bonded or pattern entangled nonwoven fabric improve sod mat propagation and sod mat handling characteristics. Although the examples included herein are carried out with polypropylene and polyester nonwoven fabrics, it will be understood that the invention is not limited thereto and that other thermoplastic polymers capable of making nonwoven fabrics can be effectively employed. Particularly preferred are chemistries which are hydrophobic. A simple screening test is called the Eye Dropper Test. To determine if a particular nonwoven fabric is hydrophobic by the Eye Dropper Test, cover the top of a ordinary kitchen water glass with the nonwoven fabric with a slight concave depression in the middle and secure the nonwoven fabric in place with an ordinary rubber band. The eye dropper is selected such that the average weight of a drop of water is from 0.045 to 0.055 grams per drop. Now add carefully twenty drops of water from an eye dropper into the concave depression formed in the nonwoven fabric supported by the glass. If the drops of water do not penetrate or wet the fabric within 3 minutes, the nonwoven fabric is hydrophobic within Eye Dropper Test of this specification. Another simple screening test is the amount of water uptake in the synthetic fibers upon exposure to high humidity and is defined as the Water Uptake Test in this specification. In the August 1978 Textile World is a 1978 Textile World Man-made Fibers Chart herein included by reference and in part reproduced below:

| Fiber | Moisture Regain (%/70° F./65% R.H.) |
|---|---|
| polyethylene | negligible |
| polypropylene | 0.1 |
| polyethylene terephthalate | 0.4 |
| acrylic | 1.0–2.5 |
| nylon 6 | 2.8–5.0 |
| nylon 66 | 4.0–4.5 |

Hydrophobic fibers are fibers with a regain of moisture of less than 2.5% and more preferably less than 1% of the fiber weight, at 70° F. and 65% R. H. Hydrophobic nonwoven fabrics within the Water Uptake Test are nonwoven fabrics which contain such hydrophobic fibers, preferably in a major proportion of the fiber content and more preferably having the fibers consisting essentially of hydrophobic fibers. An even more preferable hydrophobic nonwoven fabric within the Water Uptake Test is one in which the entire fiber content is hydrophobic fibers, especially 100% polyolefin fibers and in another embodiment 100% polyester fibers. Several illustrative examples of hydrophobic nonwoven fabrics are Ergon ENPP 0108, ACCORD® 108, and Ergon ENPY 0024. These nonwoven fabrics will be described in further detail below. The preferable chemistries of nonwoven sod reinforcements are polyolefin or polyester chemistries. Polyolefins such as polyethylene and polypropylene are particularly preferred because of their low cost, degradability, broad availability, and good balance of physical properties. Linear low density polyethylene is a particularly preferred polyethylene.

Nonwoven sod reinforcements of this instant invention are chosen to meet the needs of the landscaper or grower. Some require strong sod mats such as large grass sod applications and some need very low strength sod mats such as in Example 2 included herein. Very strong sod mats usually use heavy basis weight nonwoven fabrics and low strength sod mats usually use light basis weight nonwoven fabrics. Nonwoven fabric basis weight is expressed in ounces per square yard (opsy) or grams per square meter (gpsm). Nonwoven fabrics with a basis weight of less than or equal to about 3 opsy are preferred and nonwoven fabrics with a basis weight of less than or equal to about 1.5 opsy are more preferred and nonwoven fabrics with a basis weight of less than or equal to about 1 opsy are even more preferred and nonwoven fabrics with a basis weight of less than or equal to about 0.5 opsy are most preferred. Nonwoven fabrics with a basis weight of greater than or equal to about 0.06 opsy are preferred and nonwoven fabrics with a basis weight of greater than or equal to about 0.1 opsy are more preferred and nonwoven fabrics with a basis weight of greater than or equal to about 0.2 opsy are even more preferred. For general purpose sod mats, a nonwoven fabric basis weight from about 3 to 0.06 opsy is preferred and more preferred is a nonwoven fabric basis weight of from about 1.5 to 0.1 opsy and even more preferred is a nonwoven fabric basis weight of from about 1 to 0.1 opsy.

Modified sods of this invention are very easy to handle and propagate. I have discovered in this instant invention that while small diameter or light weight fibers (and weaker fibers) in the sod reinforcement can facilitate root penetration and entanglement, it can also retard the water infiltration or increase rain water runoff on slopes. This is particularly true for fibers based on polyester and polyolefin chemistries. This occurs because as the fibers become smaller, the pores in the nonwoven fabric become smaller and thus, water infiltration for hydrophobic nonwoven fabrics is retarded. Fiber weight is measured in denier. Denier in dtex is by definition: "the mass in grams of a fiber 9,000 m long". It can be calculated with the following formula:

$$\text{Denier (dtex)} = \frac{\text{Fiber Mass (g)}}{\text{Fiber length (m)}} \times 9,000 \text{ m}$$

Apertures are generally preferred in nonwoven fabrics with fibers in the nonwoven sod reinforcement of less than or equal to about 6 dtex and more preferred in nonwoven fabrics with fibers of less than or equal to about 3 dtex and even more preferred in nonwoven fabrics with fibers of less than or equal to 2 dtex and most preferred in nonwoven fabrics with fibers of less than or equal to about 1 dtex. Nonwoven fabrics with fiber deniers greater than or equal to about 0.1 dtex are also preferred and more preferably greater than or equal to about 0.2 dtex. For particular types of plant sod mats, some preferred ranges of fiber denier are given below. For grass sod mats, nonwoven fabrics with fibers of from about 6 to 2 dtex are preferred for a versatile range of grab strengths. For garden sod mats, nonwoven fabrics with fibers from about 6 to 0.1 dtex are preferable and more preferable are fibers from about 3 to 0.1 dtex and even more preferable are fiber deniers from about 2 to 0.1 dtex.

As discussed above, it is important to have good plant root penetration and entanglement in the nonwoven sod reinforcements to promote the growth of sod mats with good production and handling characteristics. This root penetration and entanglement of the nonwoven fabric can create mutual reinforcement of the nonwoven sod reinforcement with the roots and visa versa. The root penetration and entanglement with the nonwoven sod reinforcement also binds the planting medium to the sod mat. Root penetration is measured by the following process:

1). A representative section of sod mat is chosen for measurement—usually about 20 centimeters by 20 centimeters.

2). The roots penetrating through the bottom of the reinforcement are carefully shaved off with a sharp instrument such as a single edge razor and carefully added to a clean 2 liter beaker.

3). The shaved roots are then carefully washed with tap water by mixing and screening out the shaved roots and placing them in a separate clean 2 liter beaker.

4). Steps 2) and 3) are repeated four times (or until the roots are visually clean) to remove the dirt and nonroot foreign matter. The clean washed roots are then transferred to a pre-weighed lightweight aluminum weighing dish.

5). The washed roots in the pre-weighed dish are then dried for 8 hours at 110 degrees centigrade in a ventilated, temperature controlled oven.

6). The root penetration is then calculated as follows (20 cm by 20 cm sod mat):

| | |
|---|---|
| Gross weight (dried roots plus dish) | 5.63 g |
| Tare weight of aluminum dish | 5.50 g |
| | 0.13 g per 400 cm$^2$ of sod mat |

By numerous experiments, I have determined that a root penetration of greater than or equal to about 0.1 grams per 400 square centimeters of sod mat are preferable and more preferably is root penetration of greater than or equal to about 0.15 grams per 400 square centimeters of sod mat and even more preferable is root penetration of 0.2 grams per 400 square centimeters of sod mat. To promote early harvest, sod mats with root penetration of less than or equal to about 10 grams per 400 square centimeters of sod mat are preferred and more preferable are sod mats with less than or equal to about 5 grams per 400 square centimeters of sod mat.

Using this instant invention, excellent, versatile sod mats of numerous valuable plants may be propagated efficiently, inexpensively and with good long term root wetting. Sod of grasses, ornamental plants and nutritional plants easily and effectively produced. When using naturally hydrophobic synthetic resins in the nonwoven fabric fibers, no expensive, complex hydrophilic treatments are needed to procure good root wetting. Sod reinforcements of nonwoven fabrics of hydrophobic synthetic fibers often make particularly good nonwoven sod reinforcements. Some preferred examples of nonwoven fabrics of hydrophobic synthetic fibers are polyolefin chemistries or polyester chemistries. Polypropylene and polyethylene chemistries are especially preferable polyolefin chemistries because of their low cost. The preferred nonwoven sod reinforcements are effective with low and high denier fibers, high and low basis weight nonwoven fabrics, and large and small sod mats. For heavy basis weight nonwoven fabrics, a substantial amount of hydrophilic treatment may be required to improve water infiltration whereas with nonwoven fabrics containing apertures, the expense and complexity of hydrophilic treatments is eliminated. In addition, risk of ground water contamination from leachable hydrophilic treatments is also eliminated. For edible plants, which includes both nutritional plants and a substantial number of flowers used in salads and other foods, the risk of these leachable hydrophilic treatments being absorbed by the plants is eliminated. In summary, inexpensive nonwoven fabrics made from inexpensive hydrophobic synthetic resins are able to make sod mats with surprisingly good propagation properties and unexpected valuable end-use properties.

Figure 7:
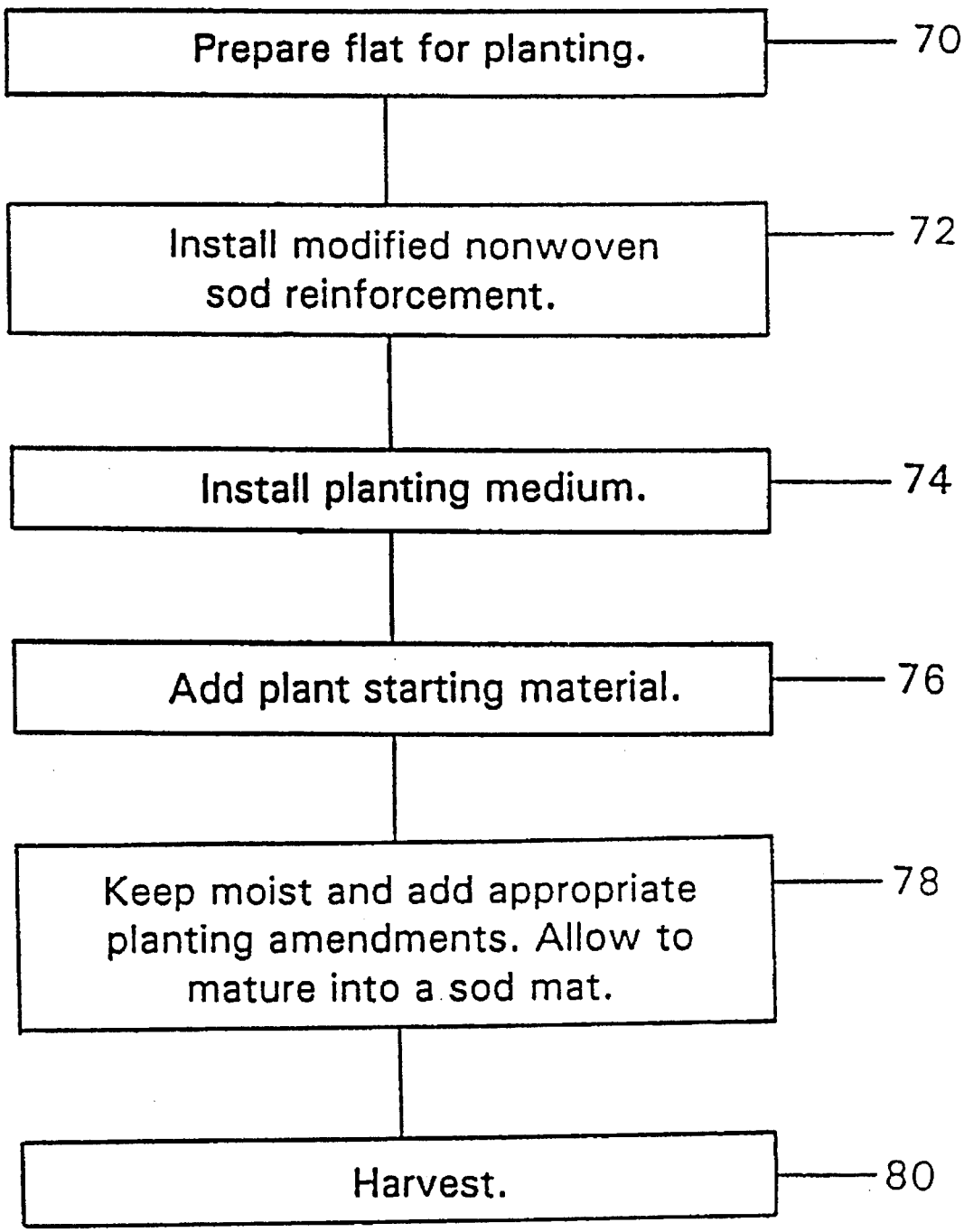
FIG. 7 is a block diagram illustrating the normal container process of the invention.
Figure 8:
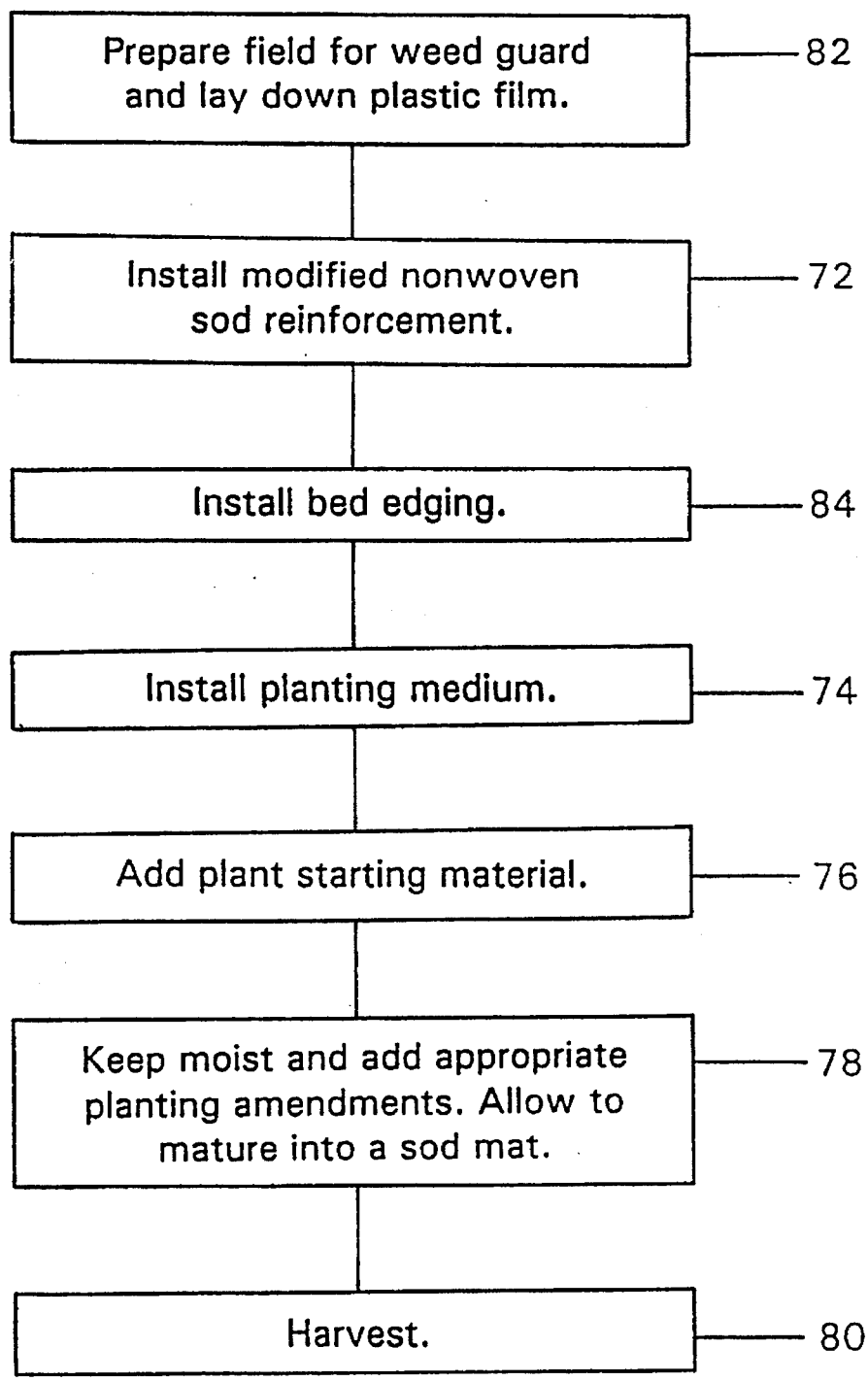
FIG. 8 is a block diagram of a typical field process of the invention.

Process Description (FIGS. 7 and 8)

In FIG. 7, there is shown a block diagram illustrating the general process for growing small modified sod mats according to this invention. The six generalized steps are: (1) the step 70 of selecting the appropriate flat or container for growing the modified sod mats of this invention. Generally the flat is from 5–10 cm deep, about 20–40 cm wide and about 20–70 cm long. Size is selected based on normal considerations of one of ordinary skill in the art such as preferred size by end-use customer, optimum depth of the planting medium for the target plant species, availability, and cost. A flat with drain holes is normally preferred. The bottom of the flat usually serves as Reference Numeral 40—the sod mat growing surface. A perforated polyethylene film is sometimes helpful for particular types of flats. Step (2) the step 72 consists of installing the nonwoven sod reinforcement (Reference Numeral 42) on the bottom of the flat (Reference Numeral 40). (3) step 74 consists of selecting and installing the planting medium (Reference Numeral 44) to the optimum depth for the target plant species. Planting medium amendments such as hay, straw, vermiculite and PERLITE® are generally added at this stage. Drenching can also be useful at times. (4) step 76 consists of adding the plant species starting material (Reference Numeral 48) to the planting medium. (5) step 78 consists of normal feeding and care of the sod mat plant species such as watering, drenching, fertilizing, proper level of sunshine or shade, soil amendments, and the like during propagation. (6) step 80 consists of harvesting the sod. One can sell the sod with the flat or remove the sod mat and sell it without the flat.

FIG. 8 is a block diagram illustrating the general process of growing modified sod mats in the field according to this invention. The seven general steps are: (1) step 82 consists of preparing the field beds by tilling the soil, removing any major weeds left, and then grade and smooth out. Lay down a plastic weed guard such as 6 mil black polyethylene film (Reference Numeral 40). Rows 4–8 feet wide by 100–200 feet are generally used. Aisles generally 3 feet wide are left between the rows for easy access. Common geotextiles are used between the rows to reduce weeds. Herbicides may also be used as desired to reduce weeds. (2) in step 72 the nonwoven sod reinforcement (Reference Numeral 42) is laid down on top of the plastic film (Reference Numeral 40). (3) step 84 consists of installing appropriate bed railing such as 4" by 4" rot resistant treated lumber on the edges of the beds to contain the planting medium (Reference Numeral 44). Optionally, 1" by 2" rot resistant lumber may also be used to further subdivide the bed into smaller individual plots. (4) step 74 consists of selecting the preferred planting depth for the selected plants and adding the planting medium. Planting medium amendments such as hay, straw, vermiculite and the like are usually added in this step. Drenching can also be useful at times. (5) step 76 consists of adding the target plant starting materials to the planting medium. (6) step 78 consists of normal feeding and care of the plants including such items as watering, drenching, appropriate light level control, soil amendments, and the like. If desired for environmental control reasons, common crop covers may be used to help warm the planting medium in the spring or for some protection from marauding birds. Hay or crop covers may be used to help to over winter the sod mats. Allow sod to mature for 1–18 months. (7) step 80 consists of harvesting the modified sod mats. The sod mats are generally harvested in sizes from 20–80 cm wide to about 20–100 cm long.

While some of the preferred embodiments of the instant invention have been discussed, it is understood that the invention is not limited to thereto, but is susceptible of numerous changes and modifications as are known to those of ordinary skill in the art using ordinary experimentation. One of ordinary skill in the art can use the embodiments of this instant invention with ordinary experimentation to develop preferred modified sod mats with nonwoven sod reinforcements. Using the teachings of this specification, good modified sod mats for many plants can easily be grown as demonstrated in the examples below.

EXAMPLES

The following examples will further aid and help to guide those of ordinary skill in the art to practice the invention. It is understood that the invention is not limited thereto, but is susceptible of numerous changes and modifications by those of ordinary skill in the art.

EXAMPLE 1

Using the sod mat propagation technique illustrated in FIG. 7, a sod mat was grown in a flat using HYPONEX® ALL PURPOSE POTTING SOIL as the planting medium and using Ergon ENPP 0108 melt blown polypropylene with a basis weight of 0.5 opsy as the nonwoven sod reinforcement. This nonwoven fabric had a series of holes melted completely through the nonwoven fabric on a repeating rectangular grid of 1 cm by 1 cm. Diameters of the apertures were about 0.4 cm. Approximately 1.5 gins of cosmos seeds were added to the flat. The modified sod was nurtured for 2 months. The modified sod mat was harvested. This sod mat was easily lifted by one end with two hands to demonstrate useful sod mat strength.

This sod mat was then planted and allowed to grow. Good root wetting and growth resulted.

EXAMPLE 2

Using the sod mat propagation technique illustrated in FIG. 7, a sod mat was grown in flat using FAIRGROW® as the planting medium and using Ergon ENPP 0177 melt blown polypropylene with a basis weight of 0.29 opsy as the nonwoven sod reinforcement. This nonwoven fabric had a series of apertures melted completely through the nonwoven fabric on a repeating rectangular grid of 0.5 cm by 0.5 cm. Diameters of the apertures were about 0.1 cm. Cherry tomato plants were planted on a grid spacing of about 3 cm by 3 cm. The modified sod was nurtured for 45 days. The modified sod mat was harvested. This sod mat was easily lifted by one end with two hands to demonstrate useful sod mat strength. It was also easily divisible by hand.

This sod mat was then divided by hand, planted and allowed to grow. Excellent cherry tomato plants resulted. Good root wetting resulted.

EXAMPLE 3

Using the sod mat propagation technique illustrated in FIG. 7, a sod mat was grown in a flat using FAIRGROW® as the planting medium and using Ergon ENPP 0177 melt blown polypropylene with a basis weight of 0.29 opsy as the nonwoven sod reinforcement. This nonwoven fabric had a series of apertures melted completely through the nonwoven fabric on a repeating rectangular grid of 2.5 cm by 2.5 cm. Diameters of the apertures were about 0.4 cm. A mixture of wildflower seeds was made of achillea millefolium (3%), cheiranthus allioni (5%), chrysanthemum leucanthum (5%), coreopsis lanceoleta (9%), echinacea purpurea (22%), hesperis matronalis (7%), linum perenne lewisii (7%), lychnis chalcedonica (2%), rudbeckia hirta (9%), centaurea cyanus (4%), coreopsis tinctoria (2%), gaillardia pulchella (9%), linum grandiflorum (14%), papaver rhoeas (1%) and silene armeria (1%) was made. Seed percentages are by weight. Seeding rate was about 2 lbs per 1000 sf. The modified sod was nurtured for 8 months. The modified sod mat was harvested. This sod mat was easily lifted by one end with two hands to demonstrate useful sod mat strength. It was also easily divisible by hand. Root penetration was about 0.15 grams per 400 $cm^2$ of sod mat.

This sod mat was then planted and allowed to grow. Good root wetting and growth resulted.

EXAMPLE 4

Using the sod mat propagation technique illustrated in FIG. 7, a sod mat was grown in flat using FAIRGROW® as the planting medium and using Ergon ENPY 0024 melt blown polyester with a basis weight of 0.48 opsy as the nonwoven sod reinforcement. This nonwoven fabric had a series of apertures melted completely through the nonwoven fabric on a repeating rectangular grid of 1 cm by 1 cm. Diameters of the apertures were about 0.2 cm. A mixture of wildflower seeds was made of achillea millefolium (3%), cheiranthus allioni (5%), chrysanthemum leucanthum (5%), coreopsis lanceoleta (9%), echinacea purpurea (22%), hesperis matronalis (7%), linum perenne lewisii (7%), lychnis chalcedonica (2%), rudbeckia hirta (9%), centaurea cyanus (4%), coreopsis tinctoria (2%), gaillardia pulchella (9%), linum grandiflorum (14%), papaver rhoeas (1%) and silene armeria (1%) was made. Seed percentages are by weight. Seeding rate was about 2 lbs per 1000 sf. The modified sod was nurtured for 8 months. The modified sod mat was harvested.

This sod mat was then planted and allowed to grow. Good root wetting and growth resulted.

EXAMPLE 5

Using the sod mat propagation technique illustrated in FIG. 8, a sod mat was grown in the field on 6 mil polyethylene film using FAIRGROW® as the planting medium and using POLYBOND® 3 opsy pattern bonded, spunbond polypropylene as the nonwoven sod reinforcement. This nonwoven fabric had a series of apertures melted completely through the nonwoven fabric on a repeating rectangular grid of 0.5 cm by 0.5 cm. Diameters of the apertures were about 0.3 cm. A mixture of wildflower seeds was made of achillea millefolium (3%), cheiranthus allioni (5%), chrysanthemum leucanthum (5%), coreopsis lanceoleta (9%), echinacea purpurea (22%), hesperis matronalis (7%), linum perenne lewisii (7%), lychnis chalcedonica (2%), rudbeckia hirta (9%), centaurea cyanus (4%), comopsis tinctoria (2%), gaillardia pulchella (9%), linum grandiflorum (14%), papaver rhoeas (1%) and silene armeria (1%) was made. This was then used to seed the sod mat. Seed percentages are by weight. Seeding rate was about 2 lbs per 1000 sf. The modified sod was nurtured for 6 months. The modified sod mat was harvested. Root penetration was about 0.1 grams per 400 cm$^2$ of sod mat.

This sod mat was then planted and allowed to grow. Good root wetting and growth resulted.

EXAMPLE 6

Using the sod mat propagation technique illustrated in FIG. 7, a sod mat was grown in the flat using FAIRGROW® and wood chips (about 2/1 ratio) as the planting medium and using POLYBOND® 1.0 opsy pattern bonded, spunbond polypropylene as the nonwoven sod reinforcement. This nonwoven fabric had a series of apertures melted completely through the nonwoven fabric on a repeating rectangular grid of 1 cm by 1 cm. Diameters of the apertures were about 0.2 cm. Liriope spicata plugs were planted on a grid of about 10 cm by 10 cm. The modified sod was nurtured for about 8 months. The modified sod mat was harvested.

This sod mat was then planted and allowed to grow. Good root wetting and growth resulted.

EXAMPLE 7

Using the sod mat propagation technique illustrated in FIG. 7, a sod mat was grown in the flat using FAIRGROW® and wood chips (about 2/1 ratio) as the planting medium and using POLYBOND® 1.0 opsy pattern bonded, spunbond polypropylene as the nonwoven sod reinforcement. This nonwoven fabric had a series of apertures melted completely through the nonwoven fabric on a repeating rectangular grid of 1 cm by 1 cm. Diameters of the apertures were about 0.2 cm. Perennial rye grass seed was planted. The modified sod was nurtured for about 6 months. The modified sod mat was harvested.

This sod mat was then planted and allowed to grow. Good root wetting and growth resulted.

Summary, Ramifications, and Scope

Valuable sod mats that are easy to handle, low cost, versatile and have good long term water infiltration characteristics are easily propagated with modified nonwoven sod reinforcements. In addition, very large strong sod mats are easily and economically propagated. Grass sod mats are a good example. Modified sod mats are also ideally suited for use on steep slopes where good water infiltration and reduced water runoff are important attributes of a sod mat. Nonwoven sod reinforcements also aid the landscaper and grower by allowing the use of sod reinforcements which are low cost, versatile and have excellent long term water infiltration characteristics. No special hydrophilic treatments are necessary to assure these long term performance characteristics and there is no chance that the hydrophilic treatments will leach from the reinforcement fibers and into the ground water or into edible plants.

Sod mats of grasses, ornamental plants, and nutritional plants are easily and economically propagated. Flower sod mats may be easily sold in bloom. These sod mats have excellent root development, root entanglement, and contain viable growing plants. The root structure remains intact during harvesting. The root structure and entanglement reinforces them during handling and installation.

Although the specifications and examples show many preferred embodiments, these are not to be construed as limiting the scope of the invention in anyway but merely as providing illustrations of some of the presently preferred embodiments of this invention. Various known techniques may be combined with this invention such as automating the production of these sod mats for greenhouses, cooling the sod mats for storage or shipping purposes, and modifying the propagation field so all irrigation water may be collected and recycled. Planting medium treatment agents can effectively be added to the nonwoven sod reinforcements to further simplify and / or improve propagation of modified plant sod mats. Illustrative examples of planting medium treatment agents include moisture absorbers, nutrients and plant growth regulators helpful to propagation. United states patent U.S. Pat. No. 5,139,566 to Zimmerman is a representative example of this technology known to those skilled in the art and is included by reference.

I claim:

1. A new and improved plant sod mat comprising the following:

a) a nonwoven sod reinforcement wherein said nonwoven sod reinforcement is a nonwoven fabric with apertures wherein said apertures are at least 0.015 cm in diameter;

b) a layer of planting medium on said nonwoven sod reinforcement and;
   c) viable plants growing in said planting medium and whose roots penetrate and entangle with said nonwoven fabric to form said sod mat.

2. A new and improved sod mat of claim 1 wherein said apertures are from about 0.4 to 0.02 cm in diameter and said apertures are spaced at a distance of less than 0.5 cm from each other.

3. A new and improved sod mat of claim 2 wherein said root penetration is greater than or equal to about 0.1 gram per 400 cm$^2$ of sod mat.

4. A new and improved sod mat of claim 1 wherein said apertures appear on said nonwoven fabric in a repeating and uniform pattern and said apertures are less than or equal to about 0.4 cm in diameter and said apertures cover less than or equal to about 15% of the surface area of said nonwoven fabric.

5. A new and improved sod mat comprising the following:
   a) a layer of planting medium;
   b) a nonwoven sod reinforcement below said layer wherein said nonwoven sod reinforcement is a nonwoven fabric which consists essentially of hydrophobic fibers and said nonwoven fabric contains apertures having diameters of at least 0.015 cm and;
   c) viable plants whose roots penetrate and entangle with said nonwoven fabric and thus form said sod mat.

6. A new and improved sod mat of claim 5 wherein said viable plants are garden plants.

7. A new and improved sod mat of claim 6 wherein said apertures are from 0.4 to 0.02 cm in diameter and repeat in a uniform manner.

8. A new and improved sod mat of claim 6 wherein said nonwoven sod reinforcement is comprised of fibers from about 0.1 to 3 dtex and said apertures are less than or equal to about 0.25 cm in diameter.

9. A new and improved sod mat of claim 6 wherein said root penetration is greater than or equal to about 0.1 grams per 400 cm$^2$ of sod mat.

10. A new and improved sod mat of claim 5 wherein said viable plants are specialty grasses and said nonwoven fabric is comprised of polyolefin fibers.

11. A new and improved sod mat of claim 10 wherein said apertures cover less than or equal to about 15% of the surface area of said nonwoven fabric.

12. A new and improved sod mat of claim 5 wherein said nonwoven sod reinforcement is selected from the group of nonwoven fabrics consisting of pattern bonded nonwoven fabrics and pattern entangled nonwoven fabrics.

13. A new and improved sod mat of claim 5 wherein said nonwoven sod reinforcement has a basis weight of less than or equal to about 3 opsy and said apertures are less than or equal to about 0.25 cm in diameter and spaced at a distance of less than about 1 cm from each other.

14. A new and improved sod mat of claim 13 wherein said plants are ornamental plants and said root penetration is greater than or equal to about 0.1 grams per 400 cm$^2$ of sod mat.

15. A new and improved sod mat of claim 13 wherein said plants are nutritional plants.

16. A new and improved sod mat comprising the following:
   a) a garden plant sod mat reinforced with a nonwoven sod reinforcement wherein said nonwoven sod reinforcement is a nonwoven fabric which contains therein apertures and said apertures cover less than 40% of the surface area of said nonwoven fabric and said apertures are from about 0.4 to 0.015 cm in diameter;
   b) a layer of planting medium on said nonwoven fabric and;
   c) plant roots which penetrate said apertures and entangle with said nonwoven fabric and said planting medium to form said sod mat.

17. A new and improved sod mat of claim 16 wherein said apertures cover less than 15% of the surface area of said nonwoven sod reinforcement.

18. A new and improved sod mat of claim 17 wherein said root penetration is greater than or equal to 0.1 gram per 400 cm$^2$ of sod mat and said garden plants comprise ornamental plants.

19. A new and improved sod mat of claim 17 wherein said garden plants comprise nutritional plants.

20. A new and improved sod mat of claim 16 wherein said apertures cover less than 25% of the surface area of said nonwoven fabric and said nonwoven fabric is comprised of polyolefin fibers and said garden plants comprise ornamental plants.

21. A new and improved sod mat of claim 16 wherein said nonwoven fabric is comprised of fibers of less than or equal to 6 dtex.

22. A new and improved sod mat of claim 16 wherein said nonwoven fabric is comprised of fibers of less than or equal to 3 dtex.

23. A new and improved sod mat comprising the following:
   a) a layer of planting medium and;
   b) a synthetic reinforcement below said layer wherein said synthetic reinforcement is a nonwoven fabric comprised of synthetic fibers selected from the group consisting of polyester fibers, polyolefin fibers, and nylon fibers and said nonwoven fabric contains apertures of at least 0.015 cm in diameter and;
   c) viable plants growing in said planting medium whose roots penetrate and entangle with said nonwoven fabric and thus form said sod mat.

24. A new and improved sod mat of claim 23 wherein said synthetic fibers comprise polyolefin fibers.

25. A new and improved sod mat of claim 24 wherein said plants comprise garden plants.

26. A new and improved sod mat of claim 24 comprising the following:
   a) said apertures are less than or equal to 0.25 cm in diameter and;
   b) said apertures are spaced at a distance of less than about 0.5 cm from each other and;
   c) and said plants are garden plants.

27. A new and improved sod mat of claim 23 wherein said synthetic fibers comprise polyester fibers.

* * * * *